INVENTOR.
THOMAS J. GRUBER
BY
ATTORNEYS.

INVENTOR.
THOMAS J. GRUBER
BY
ATTORNEYS.

_United States Patent Office_

3,406,790
Patented Oct. 22, 1968

3,406,790
SERIES MULTIPLE TYPE OF TWO-LINE LUBRICATION SYSTEM
Thomas J. Gruber, Chagrin Falls, Ohio, assignor to Eaton Yale & Towne Inc., a corporation of Ohio
Filed June 21, 1965, Ser. No. 465,299
5 Claims. (Cl. 184—7)

ABSTRACT OF THE DISCLOSURE

A lubricant manifold for use in a double-line centralized lubrication system wherein a pair of conduits extend from a source of lubricant under pressure and flow diverting means are utilized to direct the flow of lubricant from the source through one or the other of the conduits, said lubricant manifold being of the type having alternate passageways therethrough and progressively operated valves for progressively expelling lubricant from successive outlets in the manifold with repeated progressive operation when the flow of fluid is diverted from one conduit to the other after progressive operation has taken place. The manifold is characterized in that a pair of through inlets extend throughout the manifold with a check valve located in each of said through inlets.

---

This application relates to multiple valve lubricating systems and has for its principal object the provision of lubricating systems which will not become inoperative in the event of malfunction of valves or tubing supplying lubricant to bearings or lubricating points of minor importance but which will shutdown or provide an appropriate alarm in case of failure of lubricant supply to bearings or lubricating points of major importance.

Generally there are two types of lubricating systems employed in many areas of machinery and equipment. These can be basically defined as the parallel type of system and the series or progressive type of system. Each system has its own particular advantages to offer.

In the parallel type of system the function of each valve is independent of preceding valves in the system. Any blockage in the lubricating system does not provide an indication, by hydraulic means, of such blockage nor does it interfere with the continued operation of the system. On the other hand, in the series system each valve is dependent upon successful operation of preceding valves and therefore detects by hydraulic means blockage or leakage that may occur in the system.

Although the parallel system allows bypassing blocked lines or bearings without giving a warning, it permits the lubrication system to function without interruption, and does not cause machine shutdown and loss of production as a result of minor bearing problems that can be corrected during idle periods. Since there is a tendency among operators to disconnect feed lines to bearings in the case of series systems in order that production can continue without loss or interruption, it is desirable, for bearings of minor importance or of minor costs, to employ the advantages of the parallel type of system.

In carrying out the invention in accordance with a preferred form thereof, accordingly, the parallel system theory is applied to many bearings of relatively minor importance in cost which can be easily and economically replaced. The series system theory is applied to a few major or critical bearings the cost of replacement of which would be appreciable. A series type of device is provided which can be used with a parallel type of system at certain critical points to safeguard bearings of major relative size and importance without subjecting the entire lubricating system to shutdown or inducing operators to disconnect feed lines to bearings.

A better understanding of the invention will be afforded by the following detailed description considered in conjunction with the accompanying drawing in which.

Like reference characters are utilized throughout the drawing to designate like parts.

Figure 1:
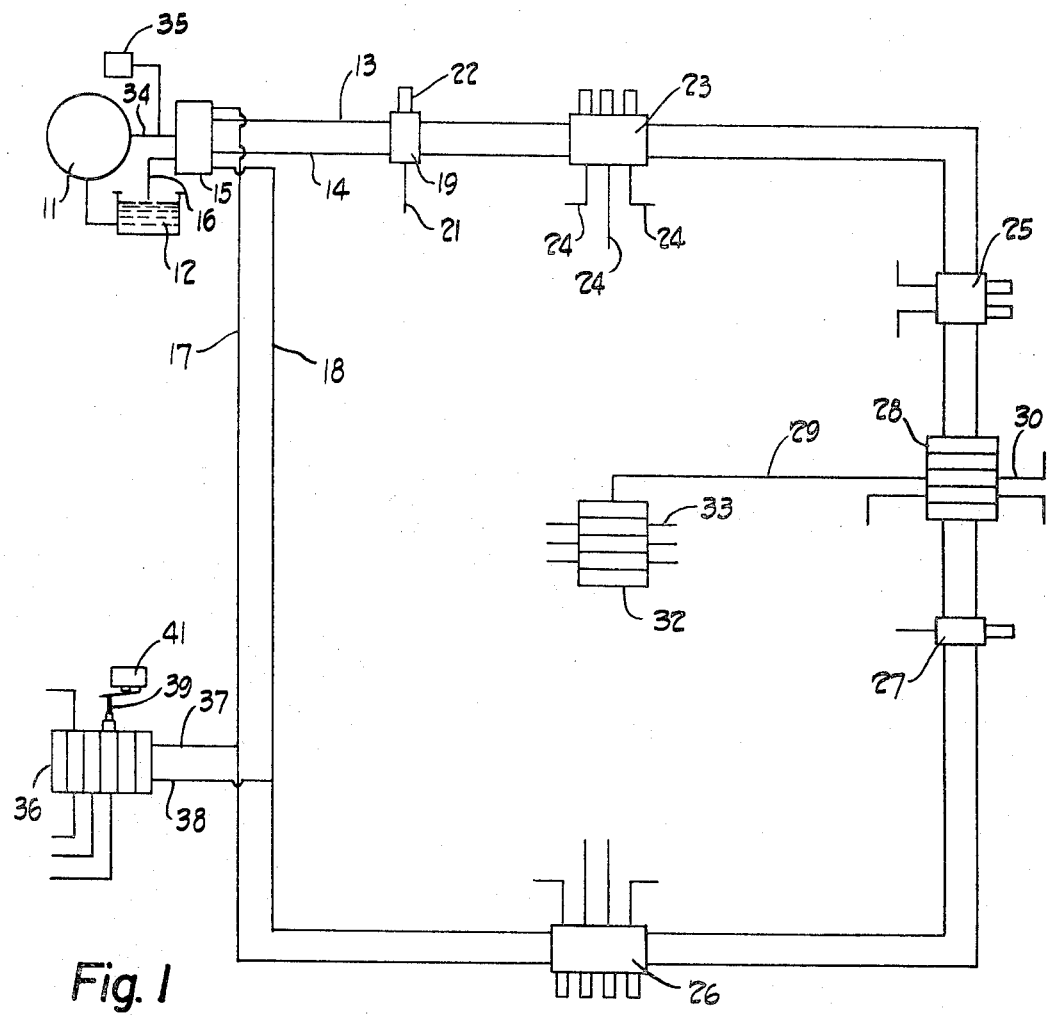
FIG. 1 is a schematic diagram of a lubricating system in accordance with the invention.

As represented schematically in FIG. 1, there is a suitable source of lubricant under pressure, shown by way of example as a pump 11 drawing lubricant from a reservoir 12 and supplying it to one or the other of a pair of lubricant conduits or lines 13 and 14, according to the position in which a four-way valve 15 is placed, and returning lubricant to the reservoir 12 through a discharge line 16 from the return end 17 or 18 of whichever of the two conduits 13 and 14 is connected to the pump 11 by the four-way valve 15. The valve 15 is of conventional construction, not constituting a part of the present invention.

One or more distributor valves or banks of distributor valves are connected to the conduits 13 and 14 in order to lubricate different points or different bearings along the system. For example there may be a distributor valve 19 with a single output line 21 for supplying a bearing and having an operation indicator rod or plunger 22, a distributor valve manifold 23 containing a plurality of valves each with an output line 24 together with other manifolds of similar types such as the distributor valve manifolds 25 and 26 and a single distributor valve 27 similar to the distributor 19. As shown, the lubricant distributors 19, 23, 25, 26 and 27 are connected in series in the conduits 13 and 14.

In order to illustrate the manner in which a series or progressive type two-line distributor valve may be employed in conjunction with a single line progressive manifold, there is shown in FIG. 1 in greater detail a series type distributor valve manifold 28 comprising a plurality of valve blocks, one or more of which has a pair of output lines such as the lines 29 and 30. One of the output lines such as the line 29 is shown connected as an input line for a single line progressive lubricant manifold or distributor 32. The latter comprises a plurality of valve blocks with output lines from each valve block, and may be similar in construction to the lubricating system illustrated in Patent No. 2,834,433.

Figure 2:
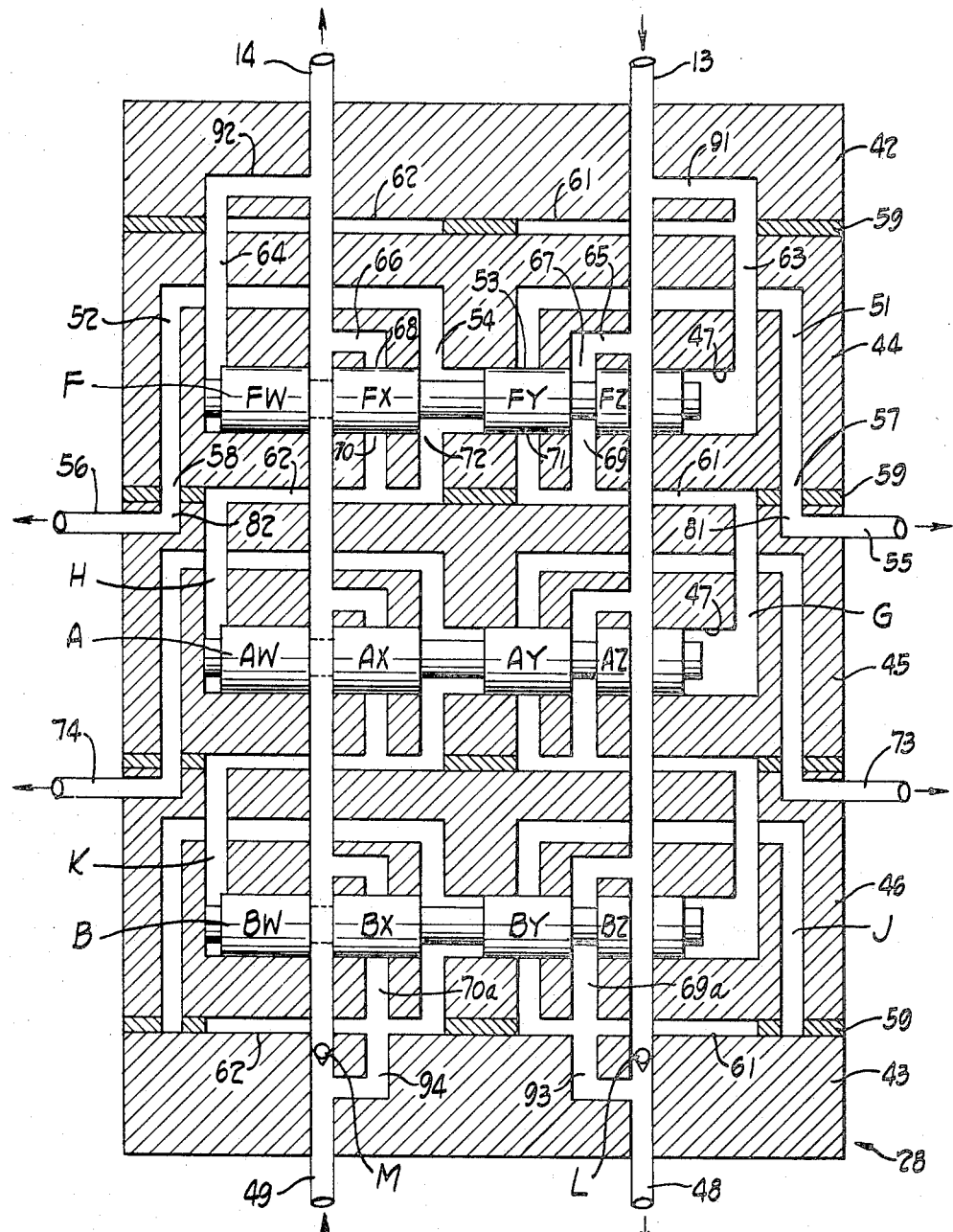
FIG. 2 is a schematic diagram of a basic manifold unit for use in the system of FIG. 1.
Figure 4:
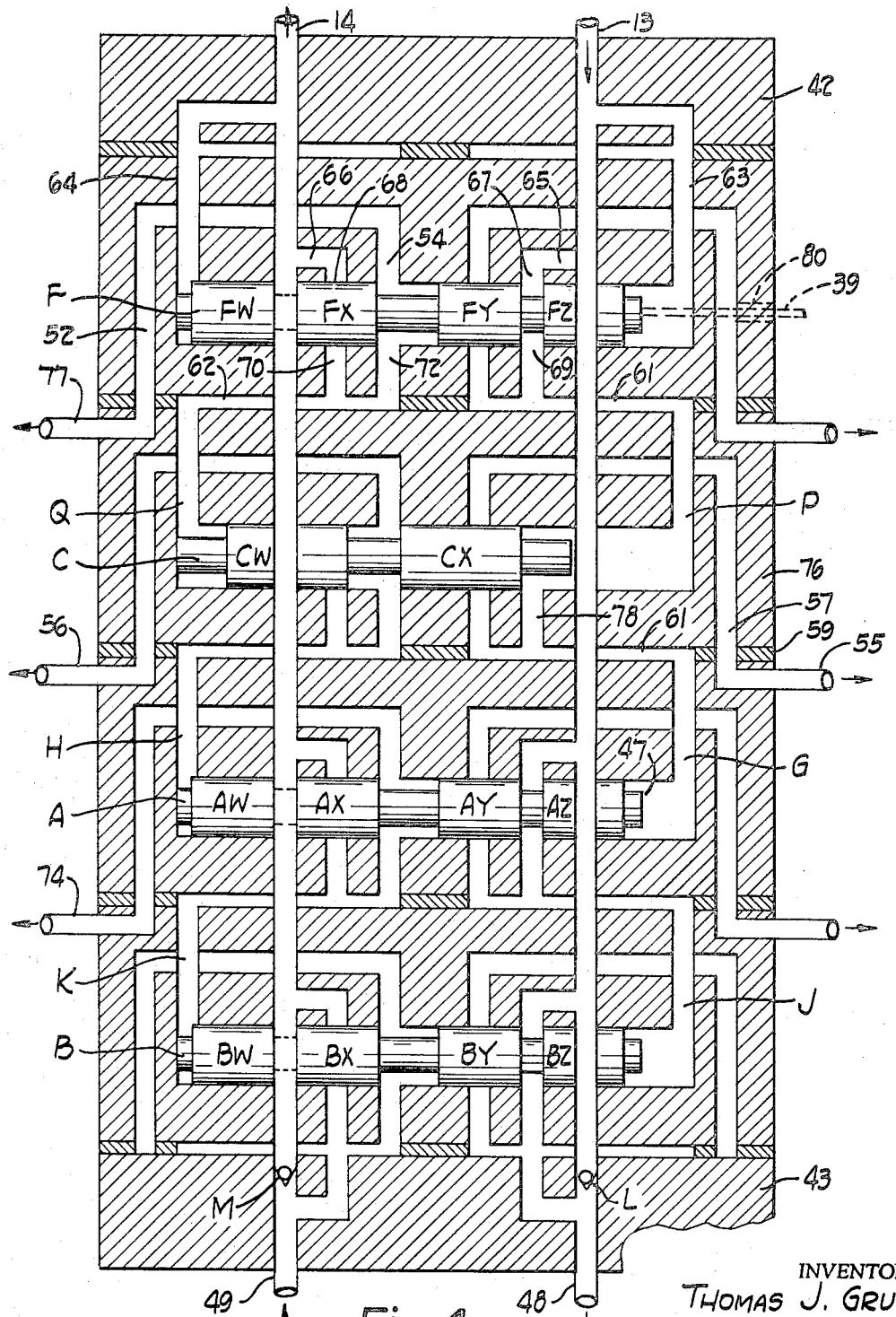
FIG. 4 is a schematic diagram of another embodiment of the invention employing more than one type of valve in the manifold.

The construction of the series type manifold 28 is shown in greater detail in FIG. 2 or 4 of the drawings of this application. It is assumed that the manifolds 28 and 32 are connected to bearings of major importance or cost or which are critical to the operation of machinery lubricated by the system so that if blockage in one of the output lines 29, 30 or 33 takes place the back pressure will build up in the supply line 13 or 14 and in the output line 34 from the pump 11 so as to actuate a pressure switch 35 for giving an alarm or shutting down the system, in a manner which is not illustrated but which may be conventional, not constituting a part of the present invention.

For lubricating bearings of minor cost and importance or which are not critical in the operation of the system being lubricated, one or more parallel connected lubricant distributor valve manifolds 36 may be provided, each of which has a pair of input lines 37 and 38 but which is connected in parallel to the lubricant conduits 13 and 14 instead of having the manifold 36 connected in series with the conduits 13 and 14.

The manifold 36 may be similar in construction to the manifold 28 except for the provision of an indicator rod 39 for actuating a limit switch 41 and indicating operation of the manifold 36. The indicator rod 39 is arranged to protrude from one of the valve blocks somewhat similar to the manner in which the indicator rod 2d, connected to one of the valve pistons of Patent 2,834,433 is employed for indicating back and forth movement of the valve piston to which it is connected.

As will be explained more in detail hereinafter, a progressive or series connected manifold connected in the line as shown in the position of the manifold 28 is provided with check valves in the end block whereas the end block of the manifold 36 in the parallel connection may be plugged instead of being provided with check valves.

Alternately to providing the pressure switch 35 to indicate malfunction of manifold 28 or other series connected valves, a pressure release device may be incorporated, which would allow the pressure to dissipate but would not actuate an alarm device. If a similar malfunction occurs in the manifold 36, the manifold itself would cease to function but the remainder of the lubrication system would continue to operate because the location of the manifold does not permit a pressure feedback to be created and thereby halt the lubrication system by hydraulic means. Accordingly, another means of indicating trouble sources is provided for manifolds such as the manifold 36 located on a junction to the main supply lines. This is accomplished by the limit switch 41 actuated by the rod 39 connected to one of the pistons in the valve manifold.

If a blockage occurs in the manifold 36, the pistons are unable to move and as a result the limit switch 41 does not operate. Therefore an electrical impulse for informing the control circuit of satisfactory operation does not reach the central station. As a result, either an alarm is activated or the pumping unit 11 is shut off until the trouble can be corrected at the manifold or feed lines to the bearings.

The basic structure of the manifold 28 consists of an inlet block 42, an outlet block 43, a flow-directing or pilot valve 44, and one or more distributor valves 45 and 46 such as illustrated in FIG. 2. The first valve or flow-directing valve 44 in a manifold of this type does not discharge lubricant to the bearings. The subsequent valves, such as the valves 45 and 46, are identical to the flow-directing valve 44 but each of them discharges lubricant through two outlets. The valves are in the form of valve blocks with cylindrical bores 47, each containing a 4-lobed piston, such as the pistons F, A and B with lobes FW, FX, FY, FZ; AW, AX, AY, AZ; and BW, BX, BY, BZ, respectively. The valve blocks 44, 45 and 46 are assembled and retained by the inlet and outlet blocks 42 and 43 through which a number of threaded rods (not shown) are inserted and to which lock nuts (not shown) are applied.

When other valve manifolds in the system of FIG. 1 follow an initial manifold with the structure shown in FIG. 2, and are connected to the initial manifold by lines 48 and 49, the first valve in any of the following manifolds will act as a shuttle device or flow-directing valve, never discharging lubricant to bearings, merely acting as a flow-directing valve.

Check valves L and M are mounted in the outlet block 43 to permit separate manifolds to be added and yet retain the feature of progressive operation. Supply lines or conduits 13 and 14 pass through each manifold without being a functional part of the feature of the progressive operation. It is therefore necessary for the supply lines at some point in the structure to become a functional part of the progressive feature. The check valves L and M force each manifold to become dependent upon a successful operation of the preceding manifold. The check valves also allow displacement from the first piston of the following manifolds, as well as displacement from the pilot pistons of any standard Farval Dualine valves that may follow, to pass through the line in relief and back to the system reservoir.

Since the valve blocks 44, 45, and 46 are of the same construction, a detailed explanation of the passageways in the valve block 44 will be sufficient. There are two outlet passageways 51 and 52, connected to the cylindrical valve bore 47 at outlet ports 53 and 54 and connected at the opposite end to outlet conduits 55 and 56 in the adjacent valve block, through openings 57 and 58, respectively in a slotted gasket 59 mounted between adjacent blocks.

Each of the gaskets 59 also has slots 61 and 62 serving to form a part of transfer passageways 63 and 64. The conduits 13 and 14 are formed with branch passageways 65 and 66 respectively, joining the cylindrical bore 47 at inlet ports 67 and 68, respectively. Opposite the inlet ports 67 and 68 are outlet ports 69 and 70, open to slots 61 and 62 respectively. Opposite outlet ports 53 and 54 are ports 71 and 72, also open to slots 61 and 62, respectively.

The flow sequence in the manifold of FIG. 2 is as follows:

Fluid pressure enters the valve manifold through conduit 13 and passes through transfer passageway 63 into the cylinder 47 moving the piston F to the extreme left end of its bore. The fluid ahead of the piston F is displaced back through transfer passageway 64 and conduit 14 and through the four-way valve 15 of FIG. 1 into the system reservoir 12.

When the piston F attains its full stroke, having been moved fully to the left to the position illustrated in FIG. 2, the lobes FY and FZ of the piston F allow fluid pressure to flow to the following valve in valve block 45 through the branch passageway 65, inlet port 67, outlet port 69, slot 61 and passage G corresponding to the transfer passage 63 of the valve block 44. Fluid pressure acting upon the end of the piston lobe AZ of piston A, moves piston A to the extreme left hand end of its bore. Simultaneously, piston A discharges lubricant through passage H (corresponding to transfer passageway 64 of the block 44), through slot 62, port 72, outlet port 54, outlet passageway 52, gasket hole 58 and outlet opening 56. As piston A attains its maximum limiting position, lobes AY and AZ at piston A, allow fluid pressure to be directed to the end of the lobe BZ of the piston B by virtue of passageway J. Piston b then moves to the left end of its bore while simultaneously discharging lubricant through passage K and outlet opening 74, thereby completing one-half cycle of operation of the valve manifold.

Thereupon fluid pressure is shifted to the conduit 14 by means of the four-way valve 15 (FIG. 1) at the central pumping station. Fluid pressure acting upon piston F from transfer passageway 64, results in piston F moving to the extreme right hand end of its bore while simultaneously displacing lubricant back through conduit 13 and the four-way control valve 15 to the system reservoir 12. Fluid pressure then acts upon pistons A and B in succession causing them to discharge to outlets 55 and 73, respectively as they are moved to the extreme right hand end of their bores. This completes the second half cycle of operation of the valve manifold. The presence of the check valves L and M forces the lubricant to pass through the transfer passageways 63, 64, G, H, J and K instead of continuing directly through the valve manifold to the outlet ends 48 or 49 of the conduits 13 and 14 so as to cause actuation of the pistons F, A and B successively and give a warning in case there should be a stoppage in any of the outlet openings 55, 56, 73, 74.

In the arrangement of FIG. 2 all of the valves are of the same type which may be referred to as the first type of valve. However, as illustrated in FIG. 4 manifolds may be constructed including valves of the first type and also a valve of a second type having two-lobed pistons instead of four-lobed pistons as illustrated by the valve block 76 containing a piston C with two lobes CW and CX. The valve block 76 is not fed directly from the two conduits as are valve blocks of the first type. Any number of valves of the second type can be included in a manifold provided there is at least one valve of the first type ahead of the second type valve and at least one valve of the first type following the second type valve.

This particular arrangement is necessary only when the manifold is used directly with the parallel type of system and there are additional parallel type valves of the nature of the illustrated two-line valve following the two-line series manifold described aforesaid. If the valves illustrated in FIG. 2 and FIG. 4 are used at a termination point of the lubrication system at either the extreme end of the system or at junction or branch points in the system, then it is necessary only to use one valve of the first type as a pilot or control valve or flow-directing valve, followed by one or more valves of the first or second type.

The manifolds illustrated can be used as master dispensing blocks that would be capable of feeding several bearings or several single line progressive type manifolds and still be able to indicate sources of trouble (see valve manifold 28 of FIG. 1). The manifold illustrated aforesaid could also be used at an integral part of a two-line system where the desire is to indicate a blockage at certain critical bearing points in a lubrication system without the necessity of submitting the entire lubrication system to the multitude of shutdowns that can be created by a system that is completely progressive.

There are some distinct advantages found in a device of this nature. The inlet ports and the outlet ports are located diametrically opposite each other, thereby necessitating the use of only a small groove to direct fluid pressure from the inlet port to the outlet port. This results in a piston, the effective sealing lobes of which, are considerably greater than those effected by a valve the inlet and outlet ports of which are staggered. In addition, fluid pressure acting upon the piston lobe, while in its sealing position, has a tendency to force the piston lobe against the opposite port thereby effecting a better seal.

Another important factor to be considered is the amount of void space existing in the valve body and between the piston lobes. All types of lubricant contain certain amounts of entrapped air which tend to be compressible particularly at higher pressures. The undesirable attribute of compressibility can affect the accuracy of a valve to a considerable degree. Therefore, where possible, all conceivable non-functioning voids should be filled with some dense, non-compressible medium. The longer piston lobes of the illustrated two-line progressive valve considerably reduce the amount of void space left between the piston lobes, thereby reducing the amount of compressibility for a given unit volume.

The flow sequence of the arrangement of FIG. 4 is as follows:

Fluid pressure enters the valve manifold through the conduit 13 and moves the piston F to the left. The fluid ahead of the piston F is displaced back through conduit 14 and through the four-way valve 15 and into the system reservoir 12 as in the arrangement of FIG. 2. When the piston F attains its full stroke, lobes FY and FZ of the piston F allow fluid pressure to flow to the two-lobed valve through the passageway P. Fluid pressure acting upon the right hand end of the piston lobe CX of piston C, moves the piston C to the extreme left end of its bore. Simultaneously, piston C discharges lubricant through the passage Q, slot 62, across ports 72 and 54 between lobes FX and FY of the piston F, through passage 52 and through the outlet opening 77. As piston C attains its maximum limiting position, the port 78 is opened, allowing fluid pressure to be directed to the end of the lobe AZ of the piston A by virtue of the passage G. Thereupon the same action takes place as already described in connection with FIG. 2.

Any suitable single-line progressive distributing valve or manifold may be employed as the single-line progressive manifold 32, for example, one such as described in Patent 2,834,433 to Higgins.

Figure 3:
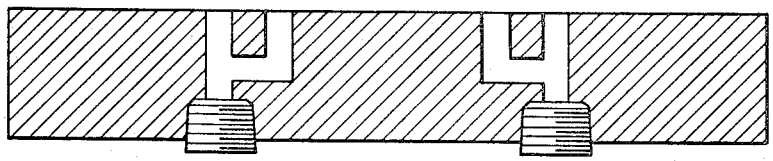
FIG. 3 is a sectional view of an end block for the manifold of FIG. 2 when used in parallel operation.

The manifold 36 connected in parallel to the lines 13 and 14 may be of the same construction as that illustrated in FIG. 2 or 4 except for the omission of the check valves L and M by replacing the outlet end block 43 with one such as shown in FIG. 3 having no check valves. In order that a limit switch 41 may be controlled by the manifold, a stem or rod 39 may be attached to one of the pistons such as the piston F, for example, and an opening 80 to receive the rod 39 may be formed in the block as illustrated in dotted lines in FIG. 4.

FIGS. 1 to 4 inclusive are schematic for the sake of illustrating the direction of flow but do not show the actual construction of the valve bodies since the porting and passages are shown on a single plane. A suitable structure for valve bodies of the type illustrated in FIG. 2 is showns in FIGS. 5 and 6. Each valve block such as the valve block 44 is provided with holes 79 for receiving the bolts employed in clamping the blocks together with the gaskets 59 between them. The gaskets 59 have corresponding bolt holes 79a.

Figure 6:
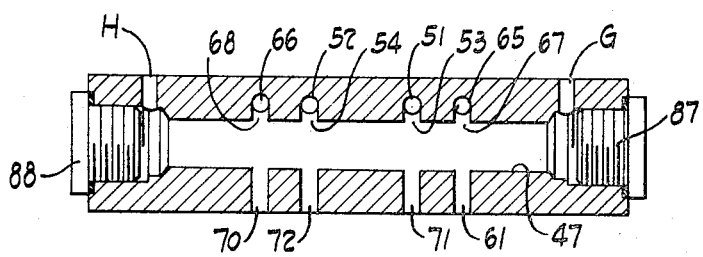
FIG. 6 is a view of a section through the axis of the cylinder in the valve block of FIG. 6 represented as cut by a plane perpendicular to the section plane of FIG. 5.
Figure 7:
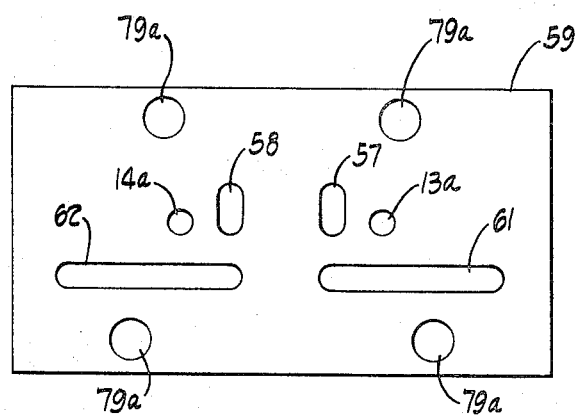
FIG. 7 is a plan view of a gasket or separator for the valve system of FIGS. 1 to 4 employed in conjunction with the valve block of FIGS. 5 and 6.

The transfer passageways G and H or 63 and 64 of FIG. 2 are formed in the actual apparatus as shown in FIG. 6 by holes drilled perpendicular to the upper face of the block intersecting the cylindrical bore 47 aligned with the outer ends of the slots 61 and 62 as shown in the gasket of FIG. 7. The ports 69, 71, 72 and 70 and connecting passageways are drilled holes in the lower face of the block placed above the block illustrated in FIG. 6 so as to register also with the slots 61 and 62 in the gasket of FIG. 7 which provides communication between the ports 69, 71, 72 and 70 of the adjacent block and the passageways G and H of FIG. 6. Holes 65 and 66 are cross drilled as shown in FIG. 6 so as to form branch passageways making a connection between inlet ports 67 and 68, respectively, and the main fluid supply conduits 13 and 14.

Figure 5:
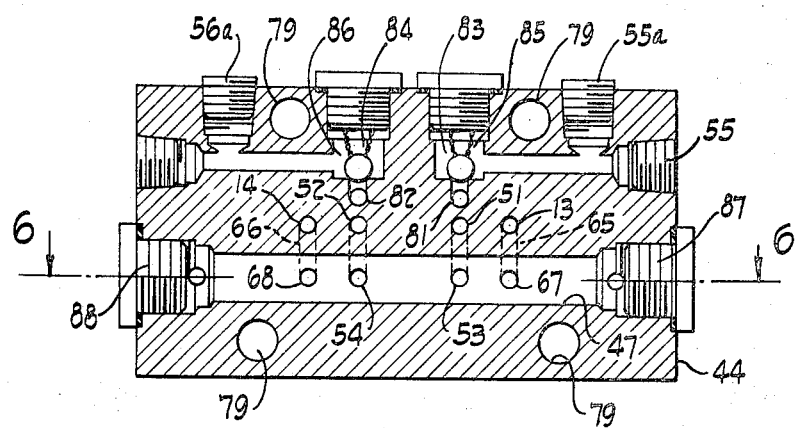
FIG. 5 is a view of a section through the cylinder axis of a valve block employed in the manifolds of FIGS. 1 to 4.

In the practical construction the gasket openings 57 and 58 as shown in FIG. 2 are in the form of slots 57 and 58 as shown in FIG. 7. The outlet passageways 51 and 52 are in the form of holes, which turn and intersect the lower face of a block as shown in FIG. 5, each of which registers with one end of one of the slots 57 and 58 in the gasket 59. The opposite ends (the upper ends in FIG. 7) of the slots 57 and 58 register with openings 81 and 82, respectively, in the upper face of the next adjacent block, which are connected through suitable passageways with the outlet openings 55 and 56.

Preferably check valve units 83 and 84 are mounted in sockets 85 and 86 which are interposed in the passageways between the block face openings 81 and 82 on the one hand and the outlets 55 and 56. As shown in FIG. 5, alternate outlet openings 55a and 56a may be employed instead of the outlet openings 55 and 56. It will be understood that whichever outlet opening is not used is plugged. The check valve units 83 and 84 are interposed between the passageways from the ends of the cylinder and the outlet openings 55 and 56 for preventing a pressure feedback, that can be caused by either bearing pumping action or lubricant compressibility, from reacting on the end of the piston and resulting in a possible piston drift.

In order that the bore 47 may be formed by drilling from one end of the block to the other, closure plugs 87 and 88 are provided for closing the bore 47 after the piston has been inserted.

As shown in FIG. 2, the inlet blocks 42 are preferably formed with branch passageways 91 and 92 each communicating at one end with the fluid supply conduits 13 and 14, respectively, and registering at the opposite end either with the transfer passageways 63 and 64 of the adjacent valve block 44 or, if desired, merely communicating with some portion of the slots 61 and 62, respectively, in the event that a gasket 59 is employed between the inlet block 42 and the first valve block 44. Although a gasket 59 is shown between blocks 42 and 44 for the sake of uniformity in production, it will be understood that the slots 61 and 62 are not utilized and, if desired, the requisite connection between the branch passageways 91 and 92 and the next block may be accomplished if they register with the transfer passageways 63 and 64.

In this manner the first block 44 serves as a pilot valve block and a direct connection is provided between whichever one of the fluid supply conduits 13 and 14 is under pressure and one end of the piston F to direct it in one direction or the other and form the passageways across ports 67 and 69 or 68 and 70 to the next valve block 45 which serves as a distributor block.

Likewise to insure delivery of lubricant under pressure to the end 48 or 49 of the conduit 13 or 14 after each of the distributor valves has functioned, the outlet end block 43 is also formed with branch passageways 93 and 94 communicating with the lubricant supply conduits 13 and 14, respectively. The passageways 93 and 94 register with the slots 61 and 62, respectively, of a gasket 59 if one is employed between the last distributor valve block 46 and the outlet end block 43; and if no such gasket is employed in this position they register with the ports 69a and 70a, respectively.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention.

What is claimed is:

1. A lubricator manifold comprising an inlet end block, an outlet end block and a plurality of intermediate valve blocks between the inlet and outlet end blocks, characterized in that each of the blocks having aligned first and second passageways therethrough with the opposite ends thereof in the end blocks being adapted to be connected to lubricant conduits, each intermediate valve block having a cylindrical bore therein closed at its ends, a piston in each bore shiftable in either direction therein, transfer passageways communicating with and interconnecting the bores so that shifting movement of one piston effects shifting movement of a following piston, whereby the pistons are sequentially shifted, each bore having inlet and outlet port means communicating therewith, the inlet port means communicating with the through passageways, an outlet passage formed in the manifold communicating with each of the outlet port means, and check valves provided in each of the through passageways in the outlet end block for preventing lubricant from passing therethrough in the normal direction of flow.

2. A lubricator manifold according to claim 1 characterized in that each piston has a plurality of lobes thereon with spaces between the lobes, the transfer passageways interconnecting the end of one bore with a pair of additional ports communicating with another bore, the shifting movement of the piston causing the pair of additional ports to be alternately uncovered.

3. A lubricator manifold according to claim 1 characterized in that each piston has a plurality of lobes with spaces between the lobes, a first transfer passageway commuicating with an end of one bore and connected to a first pair of additional ports communicating with another bore, a second transfer passageway communicating with the other end of the one bore and connected to a second pair of additional ports communicating with the other bore, the aditional ports of the first pair and of the second pair being alternatively uncovered due to the spaces between the piston lobes as the piston is shifted within the bore, each bore having two further pairs of ports in communication therewith, one port of each pair of the further pairs of ports comprising an inlet port in communication with one of the through passageways, the other port of each pair of the further pairs of ports comprising an outlet port, and a pair of outlet passages formed in each valve block, each outlet passage communicating with one of the outlet ports.

4. A lubricator manifold according to claim 1 characterized in that the inlet end block has a pair of branch passageways formed therein, each branch passageway communicating at one end thereof with one of the through passageways and at the other end thereof registering with a transfer passageway of the adjacent valve block.

5. A lubricator manifold according to claim 1 characterized in that the outlet end block is formed with a pair of branch passageways each communicating with one of the through passageways and registering with the inlet port means of the adjacent valve block.

References Cited

UNITED STATES PATENTS

| 2,007,156 | 7/1935 | Burrell | 184—7 |
| 2,708,984 | 5/1955 | Acker | 184—7 |
| 2,792,911 | 5/1957 | Harter | 184—7 |
| 2,834,433 | 5/1958 | Higgens | 187—7 |
| 2,856,023 | 10/1958 | Graves | 184—7 |

FOREIGN PATENTS

| 784,323 | 10/1957 | Great Britain. |

OTHER REFERENCES

Gesdorf, E. J.: Product Engineering, May 2, 1960 (pp. 56–59).

HOUSTON S. BELL, JR., *Primary Examiner.*